United States Patent
Krause et al.

(12) 
(10) Patent No.: US 11,597,462 B2
(45) Date of Patent: Mar. 7, 2023

(54) BICYCLE SADDLE

(71) Applicant: Ergon International GmbH, Koblenz (DE)

(72) Inventors: Andreas Krause, Koblenz (DE); Franc Arnold, Koblenz (DE)

(73) Assignee: Ergon International GmbH, Koblenz (DE)

( * ) Notice: Subject to any disclaimer, the term of this patent is extended or adjusted under 35 U.S.C. 154(b) by 159 days.

(21) Appl. No.: 16/473,755

(22) PCT Filed: Jan. 16, 2018

(86) PCT No.: PCT/EP2018/050997
§ 371 (c)(1),
(2) Date: Jun. 25, 2020

(87) PCT Pub. No.: WO2018/137971
PCT Pub. Date: Aug. 2, 2018

(65) Prior Publication Data
US 2020/0255080 A1   Aug. 13, 2020

(30) Foreign Application Priority Data

Jan. 28, 2017  (DE) .................... 20 2017 000 484.4
Aug. 28, 2017  (DE) .................... 20 2017 004 495.1

(51) Int. Cl.
*B62J 1/26*  (2006.01)
*B62J 1/08*  (2006.01)

(52) U.S. Cl.
CPC .. *B62J 1/26* (2013.01); *B62J 1/08* (2013.01)

(58) Field of Classification Search
CPC .................. B62J 1/02; B62J 1/26; B62J 1/08
See application file for complete search history.

(56) References Cited

U.S. PATENT DOCUMENTS

| | | | |
|---|---|---|---|
| 6,443,524 B1* | 9/2002 | Yu .............................. | B62J 1/02 297/195.1 |
| 7,735,916 B2* | 6/2010 | Yu .............................. | B62J 1/20 297/215.16 |
| 8,007,042 B2* | 8/2011 | Arnold ..................... | B62J 1/005 297/201 |
| 8,801,093 B2* | 8/2014 | Moravčik .................. | B62J 1/02 297/202 |
| 9,242,689 B2* | 1/2016 | Yeh ............................ | B62J 1/26 |
| 10,464,623 B2* | 11/2019 | Krause ...................... | B62J 1/00 |
| 2004/0051352 A1* | 3/2004 | Bigolin ..................... | B62J 1/26 297/214 |
| 2008/0246314 A1 | 10/2008 | Hung | |

(Continued)

FOREIGN PATENT DOCUMENTS

| | | |
|---|---|---|
| CN | 104773232 A | 7/2015 |
| DE | 202005013749 U1 | 11/2005 |

(Continued)

*Primary Examiner* — Philip F Gabler
(74) *Attorney, Agent, or Firm* — The Webb Law Firm (57) ABSTRACT

A bicycle saddle includes a saddle shell. On an upper side of the saddle shell a saddle cushion is arranged. Further, a support element is provided that is connected to a saddle frame. For decoupling the saddle shell from the support element, an elastomer body is provided between the saddle shell and the support element. A side surface of the elastomer body is at least partly curved.

21 Claims, 7 Drawing Sheets

(56) References Cited

U.S. PATENT DOCUMENTS

2010/0019553 A1\* 1/2010 Yu ............................ B62J 1/00
 297/214
2015/0130234 A1 5/2015 Bailie et al.

FOREIGN PATENT DOCUMENTS

| DE | 202005007672 U1 | 12/2005 |
| DE | 202007008321 U1 | 8/2007 |
| DE | 202008018006 U1 | 6/2011 |
| DE | 102013216812 A1 | 2/2014 |
| DE | 202015005873 U1 | 1/2017 |
| EP | 0692510 A1 | 1/1996 |
| EP | 1174458 A1 | 1/2002 |
| EP | 1174459 A1 | 1/2002 |
| EP | 2708455 A1 | 3/2014 |
| JP | 2003250666 A | 9/2003 |
| WO | 0044821 A1 | 8/2000 |
| WO | 02055366 A1 | 7/2002 |

\* cited by examiner

BICYCLE SADDLE

CROSS-REFERENCE TO RELATED APPLICATIONS

This application is the United States national phase of International Application No. PCT/EP2018/050997 filed Jan. 16, 2018, and claims priority to German Utility Model Application Nos. 20 2017 000 484.4 filed Jan. 28, 2017, and 20 2017 004 495.1 filed Aug. 28, 2017, the disclosures of which are hereby incorporated by reference in their entirety.

BACKGROUND OF THE INVENTION

Field of the Invention

The invention relates to a bicycle saddle.

Description of Related Art

Bicycle saddles are connected to a seat post by a saddle frame arranged on the lower side of a saddle shell. A saddle cushion is arranged on the upper side of the saddle shell for damping. The saddle cushion is typically covered or coated by a top layer or a cover. For improving the comfort of bicycle saddles, a large number of different designs of bicycle saddles exists. For example, gel pads are arranged inside the saddle cushion to improve comfort. Likewise, it is known to provide damping elements e.g. between the saddle frame and the saddle shell, in particular in the region of the rear of the saddle. Various types of bicycle saddles often have the drawback that the comfort is relatively low and/or the saddles have a high weight.

SUMMARY OF THE INVENTION

It is an object of the invention to provide a bicycle saddle with good comfort properties.

The object is achieved according to the invention with a bicycle saddle as defined in the present disclosure.

The bicycle saddle comprises a saddle shell. The same is preferably made of a hard plastic material. A saddle cushion may be connected to the upper side of the saddle shell. The cushion may possibly be covered by a cover layer. Further, the saddle cushion may have regions which differ in hardness, i.e. which differ in thickness and/or have different recesses. Further, the saddle cushion may be made in particular in part of different materials. According to the invention, the bicycle saddle further comprises a support element. The support element serves to connect to a saddle frame. The saddle frame serves to connect to a seat post. Possibly, the seat post may also be connected directly to the support element. Further, it is possible for the saddle frame to be designed as a connecting element between the seat post and the support element or to serve as a connecting element.

According to the invention, an elastomer body is arranged between the support element, which preferably is again made of a relatively rigid material, in particular plastic material, and the saddle shell. Thereby, the saddle shell carrying the saddle cushion is decoupled from the support element which is substantially rigidly connected to the seat post. Thereby, it is possible in particular to tilt the saddle shell sideward, seen in the traveling direction, or to allow for a sideward tilting of the saddle shell about its longitudinal axis which is directed in the traveling direction. This increases the comfort during pedaling movements, since the saddle shell moves along, at least in part, with the movement of a user's pelvis or moves synchronously with the pelvis. Thereby, in particular a uniformization of the pressure distribution during pedaling is also obtained. Specifically, using a saddle constructed according to the invention, it is also possible to compensate for an asymmetry of a user's body, e.g. a shorter leg or an askew pelvis. This is achieved automatically due to the movability of the saddle shell with respect to the support element. Thereby, possibly painful loads and pressure marks are avoided which occur in particular during use in combination with an asymmetric body.

Preferably, in the bicycle saddle of the present invention, the sitting comfort is adjusted using the saddle cushion. This can be achieved in particular through the choice of the cushion material and/or the geometric design of the cushion. Thus, different regions may be made of preferably different materials. Further, the material may e.g. be compacted differently in different regions so that different cushion zones are realized. Further, recesses and the like in the saddle cushion may be arranged to improve the sitting comfort. In addition, due to the provision of the elastomer body between the saddle shell and the support element, a damping and the possibility of a tilting movement of the saddle shell about the longitudinal axis are achieved.

The damper element is elastically deformable so that a relative movement between the support element and the saddle shell is possible. In this regard, it is in particular possible to provide elastomer bodies of different materials to design saddles having different comfort properties. The use of thermoplastic elastomers (TPE) is preferred. The use of foams, such as PU foams, is preferred. In particular, closed-cell foams are preferred. The elastomer body comprises in particular TPU (thermoplastic polyurethane) and, as is particularly preferred, is made from this material. The material manufactured by BASF under the product name "Infinergy" is particularly suited for this purpose. Methods for producing TPU are described e.g. in EP 692 510, WO 00/44821, EP 11 74 459 and EP 11 74 458. It is further preferred that the elastomer body is made of EVA (ethylene vinyl acetate) or includes EVA. Further, materials that can be used are EPP (expanded polypropylene) and EPE (expanded polyethylene). A combination of these materials or a combination of these materials with other materials is possible, e.g. in a multi-layered structure. In particular, mixtures with co- or terpolymers can also be used. Thereby, different damping and movement properties of the elastomer body can be obtained. Likewise, it is possible to provide a greater compaction of the corresponding materials in different regions, so that the damping and movement properties can be influenced thereby.

Further, a thermoplastic, damping spherical foam is suited as a material for the elastomer body. Such a foam is offered by Sekisui under the product name "ELASTIL". This is in particular a closed-cell foam. In a preferred embodiment, according to the invention, the elastomer body includes a thermoplastic, damping spherical foam such as in particular Elastil, or it is made of the same. A combination with the other materials described, which are suited for forming the elastomer body, is also possible.

Another well suited material for forming the elastomer body is a polyester-based PU-material. The material offered by BASF under the tradename "Elastopan" is particularly well suited. Preferably, the elastomer body comprises such a material or is made from the same, wherein it is again possible to combine this material with other materials described.

It is particularly preferred that the elastomer body comprises one or a plurality of particle foams, and is in particular made of one or a plurality of particle foams. In this regard. E-TPU, EPP. EPS, EPE or similar foams are preferred as the base material. Particle foams are generally formed by small spheres of the expanded base material.

These particles in the form of spheres or other bodies are given their final shape in a tool, such as a mold or the like, using temperature and possibly also water vapor. Particle foams in particular have the advantage that they have a low density, provide for good heat/cold insulation and have good damping properties.

In particular, in a sitting portion of the saddle, the elastomer body has a modulus of elasticity between 0.1 to 10 MPa, in particular 0.1 to 5 MPa, and particularly preferred 0.1 to 1.0 MPa. The particularly preferred material Infinergy E-TPU has a modulus of elasticity of 0.1 to 0.5 MPa.

Moreover, it is particularly preferred that the elastomer body has a low weight due to its low density. Specifically, the elastomer body has a density of less than 1 $g/cm^3$, particularly preferred less than 0.5 $g/cm^3$ and in particular less than 0.2 $g/cm^3$. One of the particularly preferred materials, the material Elastil, has a density in the range of 0.05 to 0.2 $g/cm^3$.

The rebound behavior of the elastomer body is preferably in a range of preferably more than 30%, in particular more than 40% and particularly preferred more than 50%.

It is particularly preferred that the support element and the saddle shell are connected exclusively through the elastomer body so as to obtain a good decoupling of the support element and the saddle shell. In this regard, a possibly provided additional connection is preferably chosen such that the decupling and damping properties are not or only slightly compromised thereby. Should no connection between the saddle shell and the support element be provided, it is further preferred to provide the same in the region of a saddle tip so that the decoupling is still guaranteed in the region of the rear of the saddle or s seat region of the saddle. According to the invention, the decoupling is advantageous in particular in this region, since, thereby, a tilting of the saddle about its longitudinal axis is possible in this region so as to compensate for pelvis movements.

The support element and/or the saddle shell are preferably made of a more rigid material than the elastomer body. It is preferred to use plastic material for manufacturing the support element and/or the saddle shell, which plastic material may possibly be fiber-reinforced. The support element and/or the saddle element preferably comprise PP, polyamides such as PA6 or PA12, or are made from these materials. The modulus of elasticity of the holding element and of the saddle shell is preferably in a range from 1000 to 10000 MPa, preferably 2500 to 6000 MPa and particularly preferred in a range from 3000 to 5000 MPa. It is preferred to use PP (modulus of elasticity: 1100 to 1450 MPa), PP GF20 (modulus of elasticity: ca. 2900 MPa) and/or PA6 GF15 (modulus of elasticity: 4500 to 6500 MPa).

According to the invention a side surface of the elastomer body is curved at least in part. A curved design of the side surface allows for a better absorption of pressure or a better absorption or support of the weight force of a cyclist. In particular the dynamic movements occurring during cycling, which specifically cause a movement between the saddle shell and the support element, can be absorbed or transmitted better by a curve of the side surface of the elastomer body. In particular, the curved design of the side surface has the advantage that even in case of dynamic loads damage to the elastomer body is avoided or the risk of damage is at least reduced. Depending on the design of the curve, it is avoided in particular that, in case of loads, the elastomer body is pressed or flexed over an edge portion of the saddle shell. Thereby, the risk of damage is significantly reduced.

The side surface of the elastomer body is in particular the outer surface of the elastomer body that is arranged between the saddle shell and the support element.

It is particularly preferred that the side surface is of a curved design in a seat region of the saddle. The seat region of the saddle is that region in which the seat bones of the cyclist are arranged during use. The greatest forces and moments occur in this region. Curved side surfaces are preferably arranged in the seat region and/or in the midportion and or in the region of a saddle tip of the saddle. A rear of the saddle may also be designed such that a side surface or the outer surface of the elastomer body is curved also in this region.

Here, in a preferred embodiment, the curve is designed such that at least a part of the side surface is concave, i.e. curved inward. In this manner, a bulging or pressing-out of the elastomer body is avoided when the elastomer body is compressed.

In a particularly preferred embodiment the side surface or the outer surface of the elastomer body is designed to be curved twice in the circumferential direction of the saddle at least in some regions, in particular in the seat region. In sectional view, the side surface thus has at least two different curves. Thereby, the risk of damage to the elastomer body can be reduced further in case of in particular dynamic loads.

It is preferred that, starting from the saddle shell, the side surface has a first convex curve. In this regard it is preferred that the curve is indeed convex, but that a very slight convex curve is provided. It is preferred that, given a straight, imaginary connecting line between the edge of the saddle shell and the edge of the support element, the side surface of the elastomer body does not protrude beyond or intersect this imaginary line in an unloaded state, even in case of a convexly designed curve.

In a particularly preferred embodiment, a second curve is contiguous to a first, preferably convexly designed curve. The former is preferably concave in shape. Here, the second curve does not have to be immediately contiguous to the first curve. For example, a transition region can be formed between the two curves. By providing two in particular curves, a further improvement is achieved, in particular with regard to the stability against continuous dynamic loads.

In sectional view the side surface is preferably curved in a S-shape. This is the case preferably in the seat region and/or the midportion and/or in the region of the saddle tip. However, the different degrees of curvature may be provided in the individual regions. Stronger curvatures are provided in particular in the seat region, since this is where the highest dynamic loads occur.

It is further preferred that, at the edges of the support element, the elastomer body is provided exclusively above the support element. This is preferred in particular in the midportion and/or the seat region. By such a design of the elastomer body, which thus extends from the edge of the support element substantially exclusively upward towards the saddle shell, it is avoided in case of great loads that the elastomer body is pressed beyond the edge of the support element or is flexed over the edge. It is further preferred that, starting from the edge of the support element, the elastomer body immediately has a convex curve so that the side surface is directed inward starting from the edge of the support element.

In a further preferred development of the bicycle saddle according to the invention, the support element is of a shell-shaped design. The outer or circumferential contour of the saddle shell thus corresponds in shape to the outer or circumferential contour of support element. It is preferred, however, that the support element is smaller than the saddle shell. Therefore, it is preferred that, in top plan view, i.e. with the saddle mounted and seen from above, the in particular shell-shaped support element is covered entirely by the saddle shell.

In a particularly preferred development of the invention, the angle of the imaginary connecting line between the edge of the saddle shell and the edge of the in particular shell-shaped support element changes, starting from a midportion of the saddle towards a rear or a rear region of the saddle. Starting from a midportion of the saddle, i.e. in particular a region between the midportion and the seat region, the angle between the connecting line and a horizontal line increases in the direction of the rear side of the saddle. In the midportion, the angle is preferably in a range from 0° to 30° so that at the angle of 0° the connecting angle extends horizontally. In a rear region or the rear edge region of the set region, the angle is preferably in the range from 30° to 90° with respect to the horizontal line, in particular 40° to 70° with respect to the horizontal line.

The connection of the saddle frame to the support element is effected in a preferred embodiment such that the saddle frame, in particular a front connection element of the saddle frame, is connected to the saddle tip, i.e. a region of the saddle directed frontward in the traveling direction. It is further preferred that the saddle frame, in particular a rear connection element of the saddle frame, is connected to a rear of the saddle, i.e. a rear of the support element directed opposite to the traveling direction. The saddle frame further preferably comprises two struts. These may both be connected to the support element in the front region. Possibly, the two saddle struts converge in the front region prior to their connection to the support element. With two struts, the connection in the region of the rear of the saddle is preferably made separately. In this case, the rear connection element has two separate connection parts.

The connection of the saddle frame to the support element in the region of the front and the rear of the saddle improves comfort, since an elastic deformation of the saddle is possible between the two connection elements. Although, due to the greater rigidity of the support element, the same is less than the possible deformation of the elastomer body, it is preferred that the support element is made of a material that allows for an elastic deformation under normal load during cycling, so that comfort is further improved.

Preferably, the support element extends from the region of the saddle tip to the region of the rear of the saddle and in particular is a connection between the front and the rear receiving element of the saddle frame. Possibly, the saddle frame may also be connected to the saddle shell in the region of the saddle tip. This is the case in particular if no support element is provided in the region of the seat post. The front end of the support element, seen in the traveling direction, can then be connected e.g. to the saddle shell or, via an intermediate element, to the saddle frame.

It is particularly preferred that the support element is integral. It is further preferred that the support element extends in the longitudinal direction over the entire length of the saddle and is connected to the saddle frame in particular both at the re of the saddle and at the saddle tip. In particular, the support element may comprise regions of different elasticity, similar to a saddle shell. This may be achieved by using different materials and/or different material thicknesses. In this manner, in particular the elasticity or the resilience of the support element can be adjusted to the desired comfort. Specifically, it is thereby possible to vary the bending of the support element around an axis extending transversely to the longitudinal direction of the saddle.

In a particularly preferred embodiment of the invention, the elastomer body extends completely across a seat region of the bicycle saddle. Here, the seat region of the bicycle saddle is the widened region of the saddle in which the seat bones of the user are arranged. It is further preferred that the elastomer body extends completely across a saddle tip of the bicycle saddle and/or across a midportion of the bicycle saddle. A combination of these embodiments is particularly preferred, i.e. that the elastomer body extends across the seat region, the saddle tip and the midportion. In this context it is preferred that the elastomer body is integral.

In the seat region it is preferred that the elastomer body covers the major part of a lower side of the saddle shell, in particular the entire lower side of the saddle shell. The elastomer body covers at least 70$, preferably at least 80% and particularly preferred at least 90% of the lower side on the saddle shell. It is further preferred that the elastomer body covers a substantial part, in particular all of the lower side of the saddle shell in the region of the saddle tip, i.e. in the front region of the bicycle saddle. In particular, the elastomer body covers the lower side of the saddle shell in the region of the saddle tip for at least 70%, preferably at least 80% and particularly preferred at least 90%. Correspondingly, it is preferred that the elastomer body is also provided in the midportion, i.e. the region of the bicycle saddle between the seat region and the saddle tip. Here, it is again preferred that the elastomer body covers a substantial part, in particular all of the lower side of the saddle shell in the midportion. It is preferred that the lower side of the saddle shell is covered in the midportion in particular for at least 70%, preferably at least 80% and particularly preferred at least 90%.

In a further particularly preferred embodiment the outer contour of the elastomer body essentially corresponds to the outer contour of the bicycle saddle, in particular of the saddle shell. Possibly, the dimensions of the elastomer body are slightly smaller than the outer dimensions of the bicycle saddle or the saddle shell. For example, the outer contour of the bicycle saddle is 2 mm to 3 mm wider along the circumference than the outer contour of the elastomer body.

In another preferred embodiment, the saddle shell extends completely across a seat region of the bicycle saddle. Thereby, in particular the force transmitted from the seat bones to the saddle can be absorbed well. It is preferred to connect such a saddle shell to an elastomer body that also extend completely across the entire seat region.

In this regard, the elastomer body preferably covers the entire bicycle saddle. Depending on the material used, it is preferred that the elastomer body has a thickness of 5 to 15 mm, in particular 5 to 10 mm. It is particularly preferred that in particular the elastomer body and particularly preferred the thickness and material thereof are chosen such that lateral edge regions can be moved downward for up to 5 mm by the load exerted by the user.

Further, it is preferred that the saddle shell extends across the saddle tip and/or the midportion of the saddle and does so in particular completely. Given a corresponding design of the elastomer body, it is again preferred that the outer contour of the saddle shell corresponds to that of the elastomer body. In particular, the saddle shell is integral and, in a particularly preferred embodiment, extends across the seat region, the midportion and the region of the saddle tip. Again, it is preferred that the elastomer body is also integral and extends across these three regions of the saddle. In a particularly preferred embodiment, an outer contour of the saddle shell corresponds to the outer contour of the elastomer body.

Similar to the support element, the saddle shell, which in a preferred embodiment is made of a harder or more rigid material than the elastomer body, may comprise regions made of different material and/or having different thickness. For example, as with the support element, it is possible to provide webs, thickenings and the like. Thereby, the elasticity properties in different regions can be varied and thus the comfort of the bicycle saddle can be varied depending on the requirements for which the respective saddle type is made.

Instead of a two-dimensional, closed saddle shell, a partial saddle shell may also be provided. For example, a two-dimensional saddle shell may be provided only in the seat region and/or in the midportion and or in the region of the saddle tip. Further, it is possible that the saddle shell has recesses. The recesses can in particular also serve the purpose of allowing in particular material of the elastomer body to pass through the saddle shell and to thereby also effect a form-fit connection to the saddle shell and possibly an adhesive or chemical connection to the saddle cushion as well.

In a particularly preferred embodiment, the saddle shell is of a frame-shaped design. As a frame, the saddle shell is designed such that it is provided in the edge region between the elastomer body and the saddle cushion as a circumferential frame. Here, the frame preferably has a width of less than 20 mm, in particular less than 10 mm. The width of the frame may also vary in the circumferential direction.

In a particularly preferred embodiment of the bicycle saddle of the invention, the support element is arranged in the seat region and is provided in particular opposite the saddle shell.

The size of the support element in the seat region is preferably 70% to 90% pf the size of the saddle shell in the seat region. The size refers in particular to the surface projected on a horizontal line in the mounted state of the saddle.

Preferably, the support element is arranged in particular opposite the saddle shell also in the region of the saddle tip. The size of the support element in this region is preferably 70% to 90% of the size of the saddle shell in the region of the saddle tip.

Further, it is particularly preferred that the support element is arranged in particular also in the midportion of the saddle, i.e. in the region between the saddle tip and the seat region. The size of the support element is preferably 70% to 90% of the size of the saddle shell in this region.

It is particularly preferred that the support element is of a shell-shaped design. The support element I comprises n particular a seat region, a midportion and a saddle tip region, these three regions preferably being integral so that a single common support element is provided. The size of the support element is preferably at least 70& to 90% of the size of the overall saddle shell. The above dimensions always refer to the correspondingly horizontally projected surface.

In a preferred embodiment the support element comprises a support edge element directed away from the saddle shell or downward when mounted. The edge element is preferably arranged in the seat region and/or in the midportion and/or in the region of the saddle tip and/or in the region of the rear of the saddle. It is preferred that the support edge element is arranged symmetrically, i.e. opposite each other, with respect to the longitudinal axis of the bicycle saddle. In a particularly preferred embodiment the edge element is circumferential in shape, i.e. in particular formed without interruptions. The height of the edge element may vary in all of the different embodiments. In particular, the edge element has a height of 3 to 5 mm. Possibly, the edge element may also have different heights in different regions. Thereby, it is possible e.g. to influence the rigidity of the support element in a simple manner.

In a further preferred embodiment, the saddle shell has a shell edge element. The shell edge element is directed towards the support element or, in the mounted state of the saddle, downward. The shell edge element may be provided in addition to or instead of a support edge element. The shell edge is preferably arranged in the seat region and/or the midportion and/or the region of the rear of the saddle. It is preferred that the shell edge element is circumferential in shape. The height of the shell edge element may vary and may in particular be designed differently in different regions. The height of the edge element is preferably in the range of 3 to 5 mm. The shell edge element is preferably designed such that it is symmetric to the longitudinal axis of the saddle, i.e. that opposing shell edge elements are always provided. The height of the shell edge element may vary. Thereby, the elasticity properties of the saddle shell can be changed. Specifically, if both a support edge element and a shell edge element are provided, it is preferred that the corresponding regions of the individual edge elements are chosen such that opposing edge elements are always provided. If, for example, a support edge element is provided in the seat region, it is preferred that a shell edge element is also provided in the seat region. It is further preferred that opposing edge elements have substantially the same height.

In a further preferred embodiment of the bicycle saddle of the invention, a holding element connected to the support edge element and/or the shell edge element is arranged in particular in the midportion of the bicycle saddle. The holding element serves in particular for gripping the saddle, e.g. for lifting or carrying the bicycle. Here, the holding element is preferably designed such that it bridged or covers a region between the support element and the saddle shell at least in part. Thereby, damage to the elastomer body is avoided in particular when the bicycle is carried or lifted by the bicycle saddle. Preferably, the holding element is arranged only at one of the two edge elements so that no connection is made between the saddle shell and the support element via the holding element. This would possibly affect the damping properties of the elastomer body. If there is a connection between the saddle shell and the support element via the holding element, the holding element is preferably made of a correspondingly elastic material so that the elasticity of the elastomer body or the movability of the saddle shell with respect to the support element is affected only slightly, if at all.

It is particularly preferred that the holding element is connected to a support edge element. If no support edge element is provided, it is preferred that the holding element is connected directly to the support element. Thus, it is possible to hold or lift the bicycle by the support element without damaging the elastomer body. Thus, no forces act on the elastomer body during carrying. Preferably, two, in particular opposing holding elements are arranged in the midportion of the bicycle saddle. In addition, such a holding element may e.g. also be provided in the region of the rear of the saddle. The holding element preferably extends across at least 50%, in particular at least 75% of the midportion, i.e. of the dimensions of the midportion in the longitudinal direction of the saddle.

In a further preferred embodiment of the invention the elastomer body has a protrusion which is preferably formed integrally with the elastomer body. The protrusion extends at least in part between the support edge element and the shell edge element. Here, the height of the protrusion preferably corresponds to the height of the edge elements in this region. If only a support edge element or only a shell edge element is provided in this region, the protrusion preferably has a height corresponding to this edge element.

The elastomer body arranged between the saddle shell and the support element is preferably fixedly connected to both elements. The elastomer body covers at 70%, in particular at least 80% and in particular at least 90% and particularly preferred at least 100% of the lower side of the saddle shell. It is further preferred that the elastomer body covers at least 70%, in particular at least 80% and in particular at least 90% and particularly preferred at least 100% of the upper side of the support element. Thereby, a good connection is made between the saddle shell and the support element and good damping properties are realized.

In a further particularly preferred embodiment, the elastomer body can be seen at least in part in a side view of the bicycle saddle. This is possible in a simple manner, in particular depending on the design of the edge elements. This has the effect that the damping characteristics of the saddle is immediately visible to the user. Thereby, the double-shell design of the saddle is also well visible by providing a saddle shell and an opposing support element.

Further, it is preferred that the bicycle saddle of the invention is designed such that, when loaded, i.e. in use, the saddle shell is pivotable with respect to the support element about a longitudinal axis of the saddle extending in the traveling direction.

In particular, it is guaranteed that the saddle shell pivots by 2° to 10° and particularly preferred by 2° to 5° with respect to the support element.

In a particularly preferred development of the invention, the elastomer body is connected to a lower side of the saddle shell in a surface-to-surface manner. It is further preferred that a surface-to-surface connection to the support element exists as well.

In a preferred development of the invention, the saddle shell is not flat in shape, but has curved regions. It is preferred in particular at the outer side of the saddle that the saddle shell has a downward directed edge. Thereby, the lateral rigidity of the saddle is enhanced. With such a saddle shell a space is formed below the saddle shell, in particular in the seat region. In a preferred embodiment the elastomer body is arranged at least in part in this space.

In a preferred embodiment of the invention the elastomer body has protrusion that at least partly surrounds an outer edge of the saddle shell in the circumferential direction. Thus, in the mounted state, the protrusion of the elastomer body is arranged laterally to the side or laterally outside the saddle shell. In side view, the protrusion covers the outer edge or the outer rim of the saddle shell. If the protrusion is formed to extend around the entire circumference, the edge of the saddle shell is not visible. It is further preferred that this protrusion also slightly covers the saddle cushion sideways or extends into the saddle cushion. The protrusion of the elastomer body thus has a height that is greater than the height of the saddle shell in the region of the outer edge of the saddle shell. Therefore, the elastomer body also covers a lower outer edge of the saddle cushion. Saddle cushions are typically made such that the edge of the saddle cushion is cut manually or by a machine, where applicable. Such a cut edge is possibly inaccurate or has a certain tolerance. By providing the protrusion on the elastomer body, this cut edge is covered.

Another embodiment relates to a bicycle saddle with a support element connected to a saddle frame for connection to the seat post, as described above. An elastomer body is connected to an upper side of the support element or is arranged on the upper side of the support body. A side surface of the elastomer body is at least partly curved in shape. In contrast to the above described embodiment, this embodiment comprises no saddle shell, but exclusively a support element with a correspondingly formed elastomer body. In a preferred development, a saddle cushion may be arranged on the upper side of the elastomer body, with no saddle shell being arranged between the elastomer body and the saddle cushion.

It is particularly preferred that the elastomer body is made of the above described material, in particular an E-TPU. In particular the design of the preferably twice curved side surface is shaped corresponding to the preferred embodiments described with reference to the above invention. Here, according to the invention, the curvature of the side surface extends between an upper side of the elastomer body and the support element. The preferred developments of the elastomer body thus correspond to the preferred embodiments described with reference to the above invention. This also applies to the other preferred embodiments, In particular also with respect to the support element, the connection to the saddle frame, etc. The protrusion connected to the elastomer body in the preferred embodiment may also be provided in this invention, wherein the protrusion does not laterally cover a saddle shell, but merely covers a lateral region of the saddle cushion, so that in particular a cut edge is covered thereby.

The invention further relates to a method for manufacturing a bicycle saddle, in particular a bicycle saddle described above. The manufacture is such that the saddle shell and the support element are placed in a mold, in particular an injection mold. Placing is such that a distance is provided between the saddle shell and the support element, the two elements being arranged opposite each other, so that an upper side of the support element is arranged opposite the lower side of the saddle shell. Of course, it is preferred that the components are formed symmetric to a longitudinal axis of the saddle and are correspondingly arranged symmetrically. According to the invention, the material of the elastomer body is then introduced or injected between the saddle shell and the support element. For this purpose, the material of the elastomer body is preferably directly connected to the lower side of the saddle shell or the upper side of the support element.

Thereafter or possibly during the same manufacturing step, the saddle cushion can also be applied or injected thereon.

BRIEF DESCRIPTION OF THE DRAWINGS

The invention will be explained in more detail hereinafter with reference to a preferred embodiment and to the accompanying drawings.

In the Figures.

DESCRIPTION OF THE INVENTION

Figure 1:
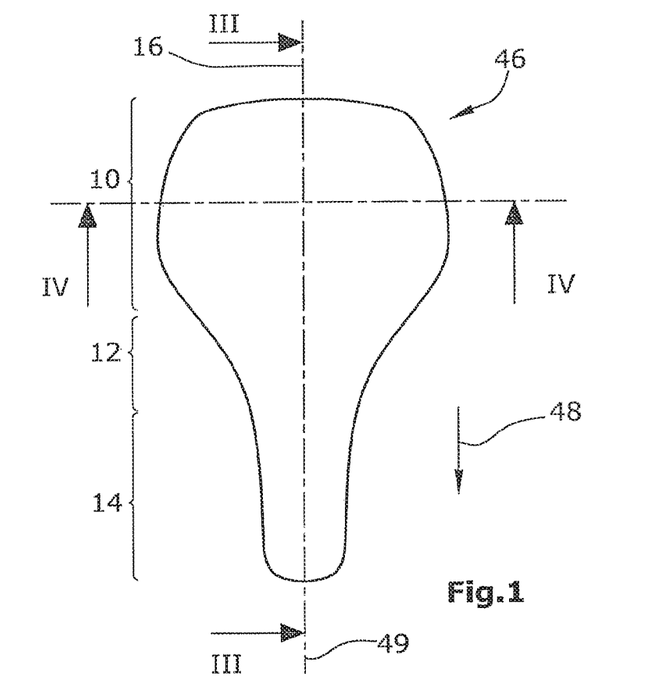
FIG. 1 is a schematic top plan view of a bicycle saddle.

In top plan view a bicycle saddle has a seat region 10 adjoined by a midportion 12. The midportion 12 transitions into the saddle tip 14. The saddle tip 14 is narrow in shape and the seat region 10 is wide in shape, so that the major part of the cyclist's weight is absorbed in particular via the seat bones. The bicycle saddle is formed to be symmetric with respect to a center axis 16 that extends in the longitudinal direction.

Figure 2:
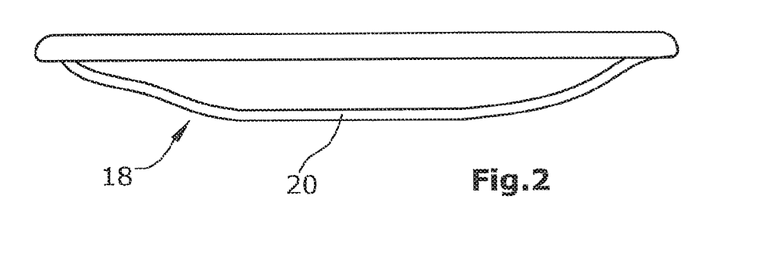
FIG. 2 is a schematic side view of the bicycle saddle illustrated in FIG. 1.

A lower side of the bicycle saddle is connected to a saddle frame 18 (FIG. 2) The embodiment of the saddle frame 18 illustrated comprises in particular two struts extending substantially in the longitudinal direction of the saddle. In a midportion 20 of the two struts of the saddle frame 18, the same can be connected to the seat post through a fastening element.

The bicycle saddle of the invention has a saddle shell 22 (FIG. 3) made of a relatively rigid material. A saddle cushion 26 is arranged on an upper side 24 of the saddle shell 22. As in the embodiment illustrated, the same may be covered by a cover layer 28.

Figure 3:
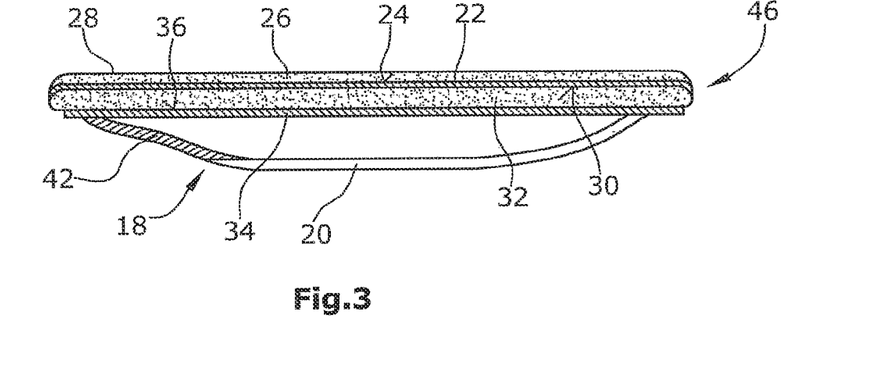
FIG. 3 is a schematic view along line in FIG. 1.

An elastomer body 32 is arranged at the lower side 30 of the saddle shell 22. In the embodiment illustrated the elastomer body 32 extends over the entire lower side 30 of the saddle shell 32 and is connected to the same in particular in a two-dimensional manner.

Figure 4:
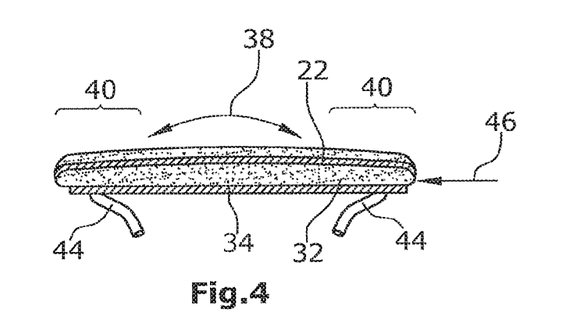
FIG. 4 is a schematic sectional view along line IV-IV in FIG. 1.

A support element 34 is provided opposite the saddle shell 22. Thus, the elastomer body 32 is arranged between the saddle shell 22 and the support element 34. The connection between an upper side 36 of the support element 34 and the elastomer body 32 is preferably again made over the entire upper side 36. Since the saddle shell 22 is preferably not connected to the support element 34, or preferably only the region of the saddle tip 14, the saddle shell 22 is decoupled from the support element 34. In a particularly preferred embodiment it is thus possible that the saddle shell 22 can be tilted in particular in the seat region 10, as indicated by the arrow 38 (FIG. 4). In outer regions 40 of the seat region, the saddle shell can thus yield by e.g. up to 5 mm, given a corresponding load. Thereby, the tilting movement of the pelvis during cycling is compensated in part and the saddle moves along with the tilting movement of the pelvis.

The saddle frame 18 is connected to the support element 34 in the region of the saddle tip 14, using a front connection element 42. Further, the saddle frame 18 is connected to a rear of the saddle 46 through two rear connection parts 44, the rear in particular adjoining the seat region in a direction opposite to the traveling 48 (FIG. 1).

In the embodiment illustrated in FIG. 4, the saddle shell 22 is arranged at a distance from the support element 34 also in the outer edge region 40. Thereby, the elastomer body 32 is visible to the user when seen from the side (arrow 46).

In a first alternative embodiment (FIG. 5) the support element has a preferably circumferential support edge element 48. In the embodiment illustrated the saddle shell 22 also comprises an in particular circumferential shell edge element 50. Both edge 48, 50 are directed downward in the mounted state (arrow 52). In the embodiment illustrated a protrusion 54 of the elastomer body 32 is arranged between the two edge elements 48, 50. It is also possible to provide only one of the two edge elements 48, 50. In particular, only parts may be provided with edge elements in the longitudinal direction. Specifically, if the edge element 50 is not provided or is at least not provided in sections, the elastomer body 32, in particular the protrusion 54 of the elastomer body 32, is well visible to the user from the side (arrow 46).

Figure 5:
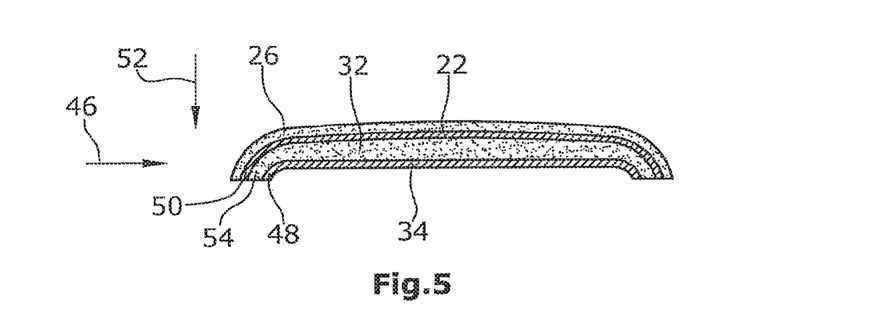
FIG. 5 is a schematic sectional view of an alternative embodiment along line IV-IV in FIG. 1.

In another alternative embodiment of the invention (FIG. 6) edge regions 48, 50 are provided corresponding to the embodiment illustrated in FIG. 5, which regions do not necessarily have to be circumferential. In addition, in the embodiment illustrated, a holding element 56 is formed with the edge region 48 of the support element 34, in particular integrally with the edge element 48 and the support element 34. The holding element 46 extends substantially horizontally and covers the protrusion 54 of the elastomer body 32. This allows for a simple gripping of the saddle e.g. for carrying the bicycle, while it is ensured that the elastomer body is not loaded or even damaged thereby.

Figure 6:
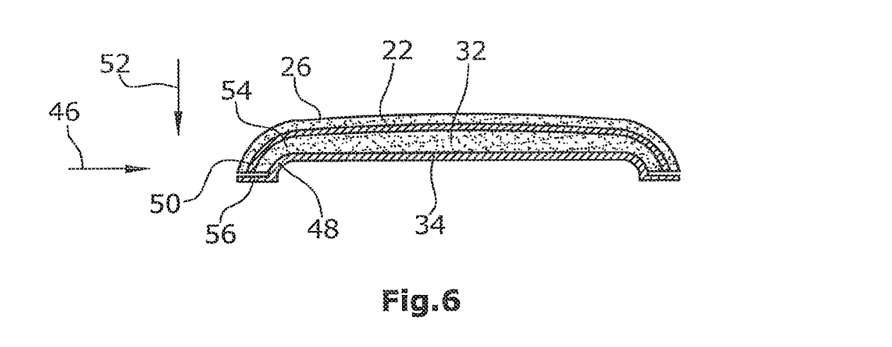
FIG. 6 is a schematic sectional view of a further alternative embodiment along line IV-IV in FIG. 1.

The holding element 56 is preferably provided in the midportion 12 and, in a particularly preferred embodiment, extends into the seat region 10. The holding element 56 may in particular also be circumferential in shape.

Hereinafter, a further preferred embodiment of the bicycle saddle of the invention is presented with reference to FIGS. 7 to 9c. Here, similar and identical components are identified by the same reference numerals.

Figure 7:
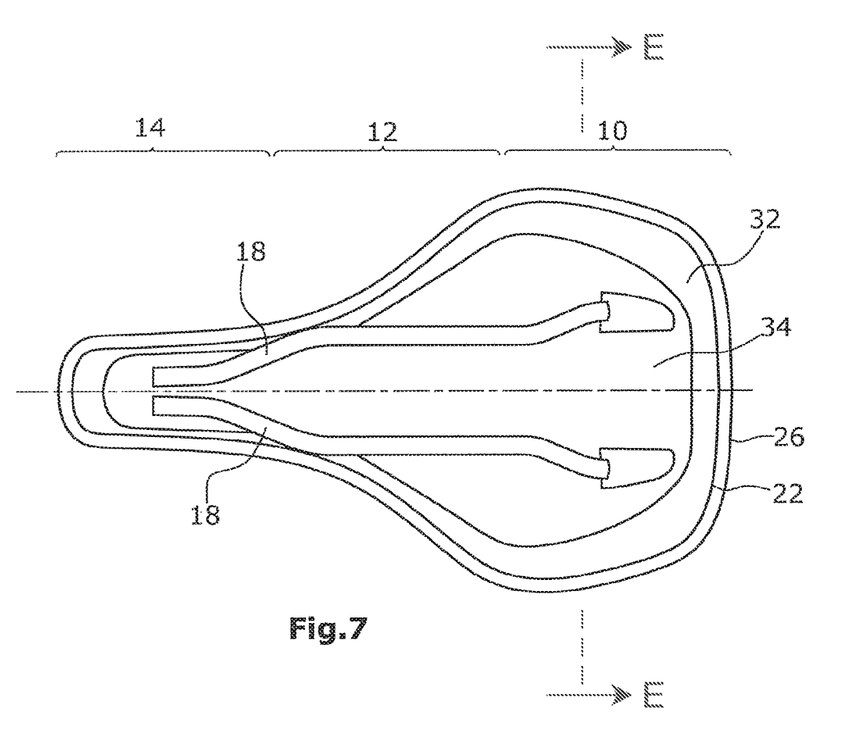
FIG. 7 is a schematic bottom view of a further preferred embodiment of the bicycle saddle of the invention.

FIG. 7 shows a preferred embodiment of the bicycle saddle from below. A lower side of the shell-shaped support element 34 is connected to the two struts of the saddle frame 18. Here, the connection is made in the region of a saddle tip 14, on the one hand, and in a rear region of the seat region 10 of the bicycle saddle, on the other hand. Further, in the bottom view illustrated in FIG. 7, the edge of the saddle shell 22 and the region of the elastomer body 32 arranged between the support element and the saddle shell 22 are visible. In particular, it can be seen in the bottom view (FIG. 7) that the shell-shaped support element 34 is smaller in size than the saddle shell 22. In top plan view the support element 34 is arranged entirely in the saddle shell 22.

Figure 7A:
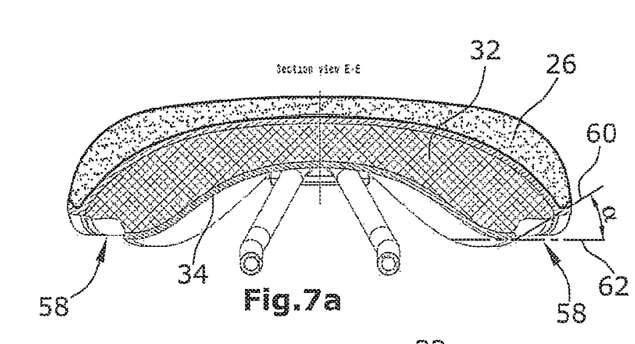
FIGS. 7a to 7d are different sectional views of the bicycle saddle illustrated in FIG. 7, FIGS. 8a to 8d show a sectional view of a bicycle saddle without saddle shell in FIG. 7, in different load states.
Figure 7B:
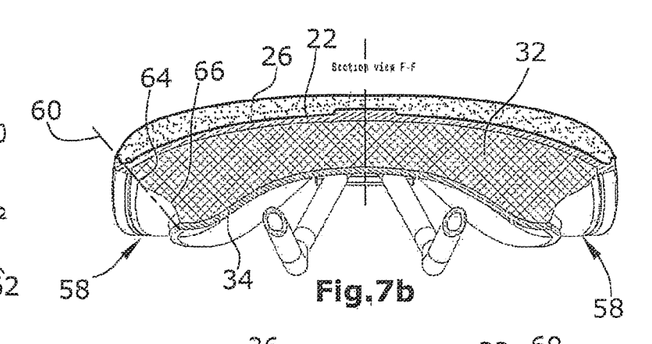
Figure 7C:
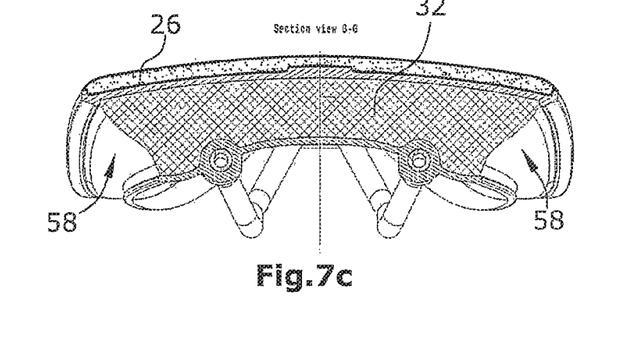
Figure 7D:
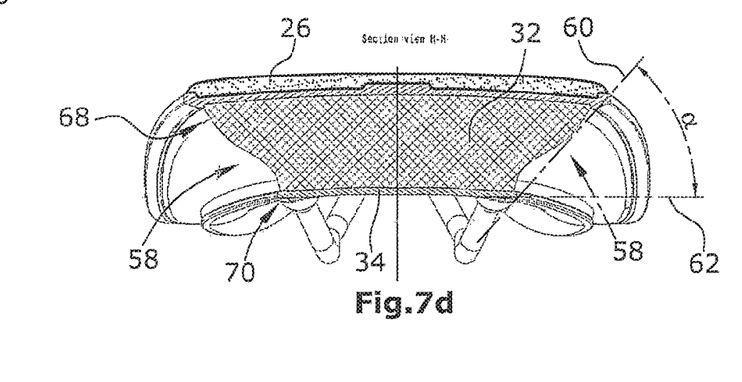

For clarifying the design of a side surface or outer surface 58 of an elastomer body 32, FIGS. 7a to 7d show different sectional views. Here, FIG. 7a shows a section E-E, FIG. 7b shows a section F-F, FIG. 7c shows a section G-G and FIG. 7d shows a section H-H in FIG. 7.

It can be seen in FIGS. 7a to 7d that the side surface 58 of the elastomer body 32 is always curved in shape. However, the inclination of the side surface changes. Starting from the section E-E in the front part of the seat region 10 or in the transition region between the midportion 12 and the seat region 10, the orientation of the side surface becomes steeper. As indicated in FIG. 7a by a broken line 60, when mounted, the angle of the side surface 60 is significantly smaller with respect to a horizontal line than in the rear region of the saddle (section H-H, FIG. 7d). Starting from a transition region between the midportion 12 and the seat region of the saddle, the angle of the side surface 58 thus increases with respect to a horizontal line 62 in the direction of a rear of the saddle. In a transition region between the midportion 12 and the seat region 10, an angle α between the horizontal line 62 and the connecting line 60 is in a range from 0° to 30°. In the rear region of the saddle, i.e. in the outer part of the seat region 10, the angle α preferably is in a range from 30° to 90°, in particular 40° to 70°.

As in all sections illustrated (FIGS. 7a to 7c), the side surface 58 visibly has a double curvature. The elastomer body 32 has a first curvature 64 in the region arranged below the saddle shell 22 or in the region immediately adjoining the saddle shell 22. This first curvature 64 is slightly convex. It is preferred in this context that, in a non-loaded state, as illustrated in FIGS. 7a to 7d, the curvature 64 does not or only slightly intersect with a connecting line 60 connecting the two edges or rims of the saddle shell 32 and of the shell-shaped support element 34. The first curvature 64 is adjoined by a second curvature 66. The curvature 66 is concave so that, in this region, the side surface 58 is directed inward from the line 60. A direct or e.g. also a linear transition may be provided between the two curvatures 64, 66.

Another preferred special feature of the design of the bicycle saddle of the present invention is that the elastomer body 32 protrudes sideways neither beyond the saddle shell 22, nor beyond the support element 34 in the region of the corresponding connections 65, 70 (FIG. 7d). Thereby, in particular in case of a dynamic deformation of the elastomer body 32, a damage to the elastomer body 32 is avoided in particular by the edge of the saddle shell 22 or of the support element 34 in the regions 68 or 70, respectively.

FIGS. 8a to 8d show sectional views of the bicycle saddle in different load states. FIGS. 8a to 8d show an embodiment of the saddle according to the further invention, the bicycle saddle not being provided with the saddle shell 22 described before. The load states shown in FIGS. 8a to 8d analogously apply to a bicycle saddle with a saddle shell 22. In the preferred embodiment of a bicycle saddle according to the further invention, illustrated in FIGS. 8a to 8d, all elements are preferably designed identically with the elements described with reference to the other invention, except for the fact that a saddle shell 22 is omitted.

Instead of a saddle shell, a saddle according to this embodiment may have one or s plurality of reinforcing elements arranged between the elastomer body 32 and the seat cushion 26. These are preferably arranged in the edge region between these two bodies and extend in particular in the longitudinal or the circumferential direction. Preferably, such reinforcing elements are arranged in the seat region 10 and/or the midportion 12 and/or in the region 14 of the saddle tip, as well as in a back or rear region, if so desired. Preferably, these may also be a frame-shaped saddle shell, as described with respect to the invention provided with a saddle shell.

Figure 8A:
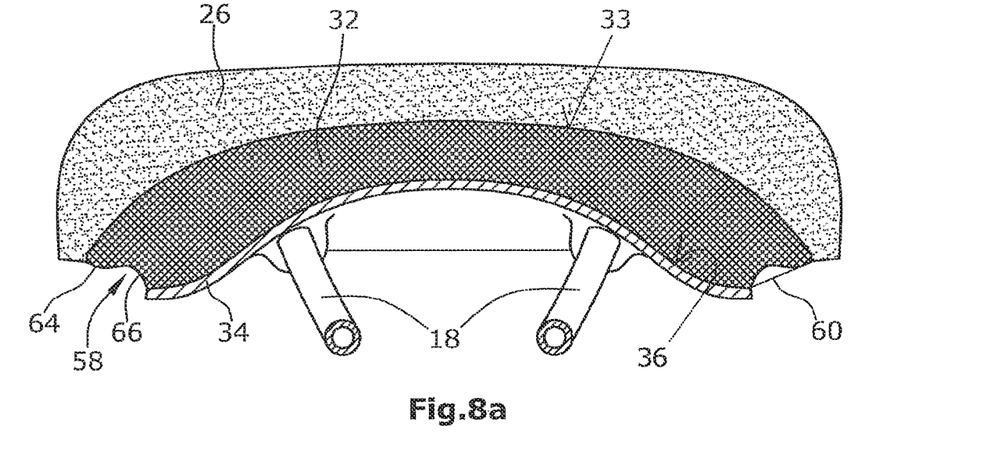

FIG. 8a shows the saddle of FIG. 7a along a cross section E-E in FIG. 7.

In the non-loaded state (FIG. 8a) the elastomer body 32 has a side surface 58 with the two curved regions 64, 66 which are arranged inward the connecting line 60.

Figure 8B:
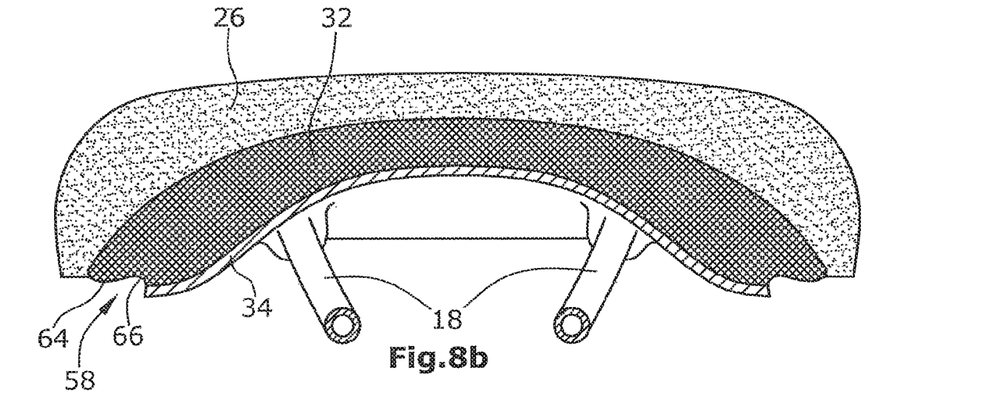
Figure 8C:
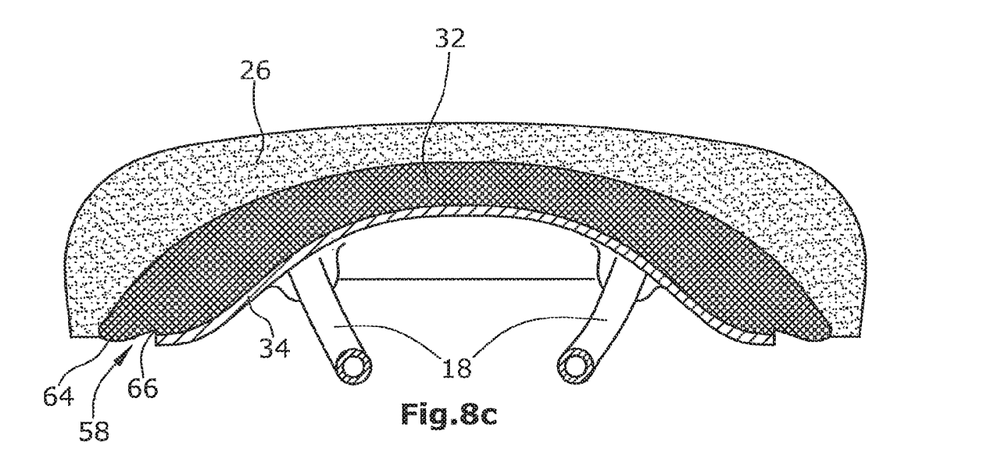
Figure 8D:
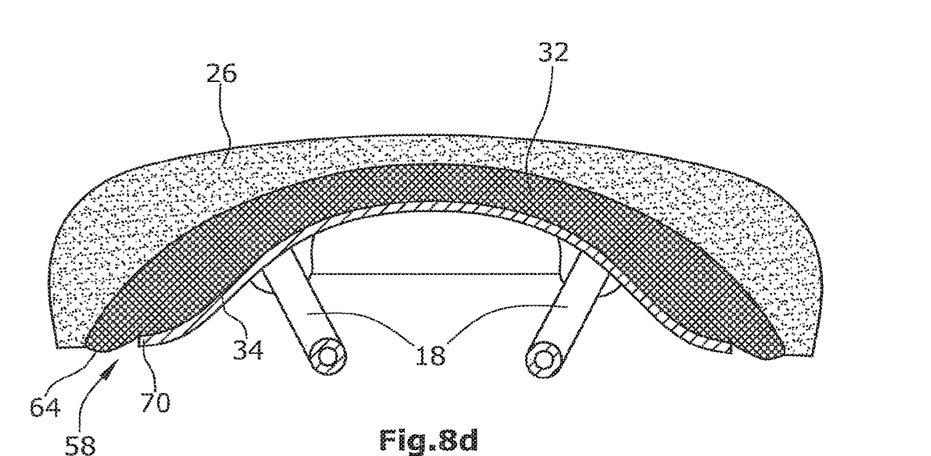

FIGS. 8b, 8c and 8d show a side view corresponding to FIG. 8a, with different loads being illustrated. FIG. 8b illustrates a static load of 80 kg, FIG. 8c illustrates a static load of 135 kg and FIG. 8d illustrates a static load of 190 kg. The deformation of the elastomer body 32 caused by the load is obvious from FIGS. 8a to 8d. The concave curvature 66 becomes smaller as the load increases, until it is fully compressed under an extreme load (FIG. 8d). Since, however, the curvature 66 is a concave curvature, it is ensured that the elastomer body 32 is not pressed beyond an edge 70 of the support element 34 even under extreme weight, so that damage to the elastomer body 32 is prevented even under extreme load (FIG. 8d).

The convexly curved region 64 is correspondingly caused to bulge outward to a greater extent due to the load. However, since this occurs in the upper region of the elastomer body 32, i.e. in the region of the elastomer body 32 connected to the saddle shell 22, the same is irrelevant with respect to damage and means significantly less load on the elastomer body.

Figure 9:
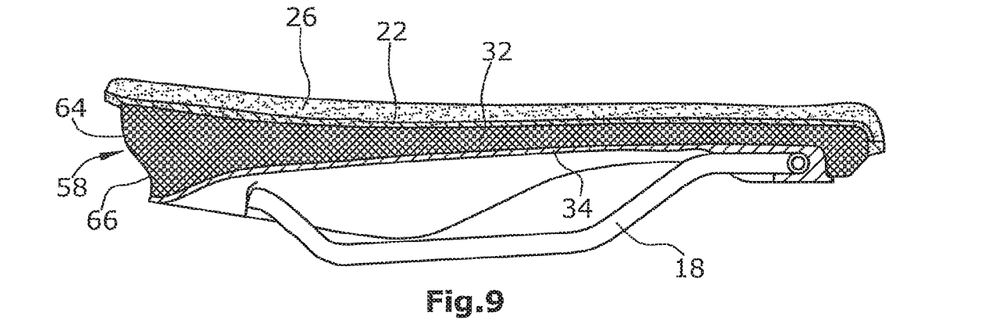
FIG. 9 is a longitudinal section of the bicycle saddle illustrated in FIG. 7, FIGS. 9a to 9c are illustrations of the rear region of the sectional view of the bicycle saddle shown in FIG. 9, in different load states.

FIG. 9 illustrates a longitudinal section of the saddle along line I-I in FIG. 7. From this it is obvious that the side surface 58 is curved also in a rear region of the saddle or at the rear of the saddle. An S-shaped curvature is preferred, having a first curvature 64 and a second curvature 66. In the embodiment illustrated, the first curvature 64 first extends substantially vertically, with the side surface 58 then extending inward and transitioning into the concave curvature 66.

Figure 9A:
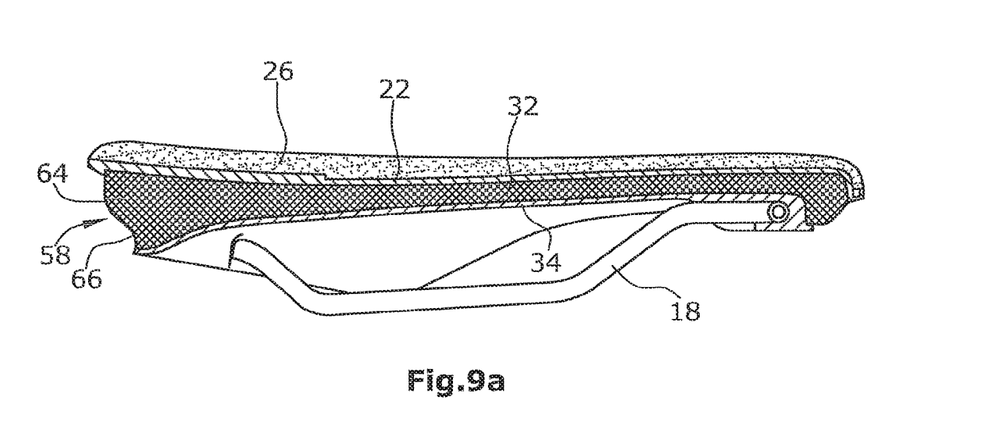
Figure 9B:
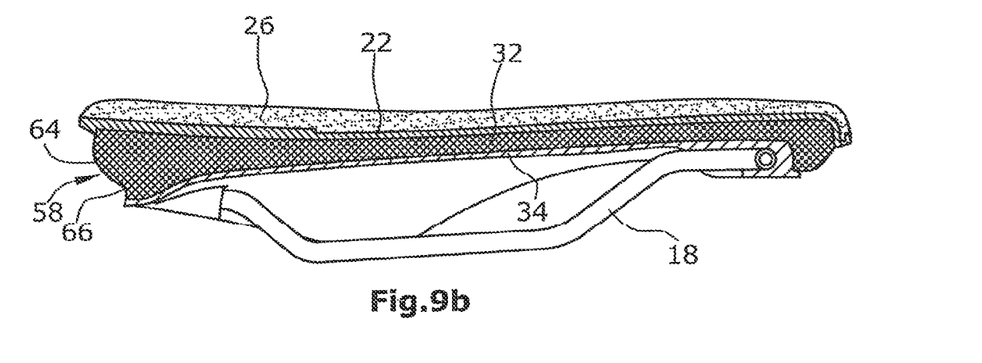
Figure 9C:
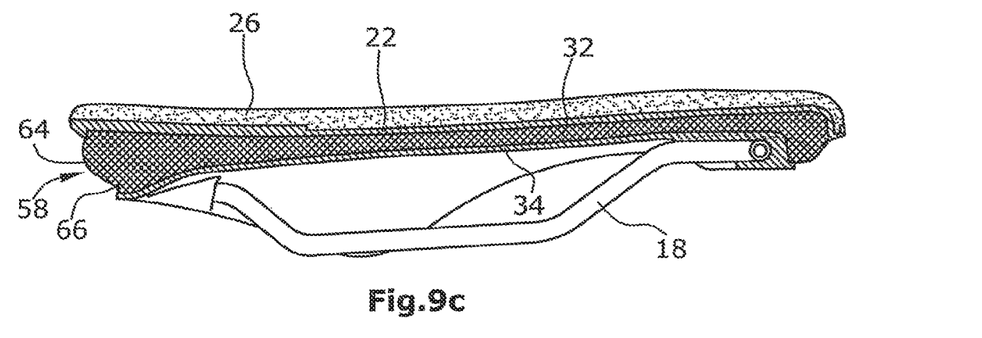

FIGS. 9a to 9c show the rear region of the saddle according to the sectional view (FIG. 9) in various load states. FIG. 9a illustrates a static load of 80 kg, FIG. 9b illustrates a static load of 135 kg and FIG. 9c illustrates a static load of 190 kg. It is again evident from FIGS. 9a to 9c that the concave curvature 66 becomes smaller as the load increases, and the concave curvature 64 becomes larger as the load increases.

With respect to the deformation of the elastomer body 32, the static loads illustrated and explained above which act on the elastomer body 32 also occur analogously upon dynamic loads.

Figure 10:
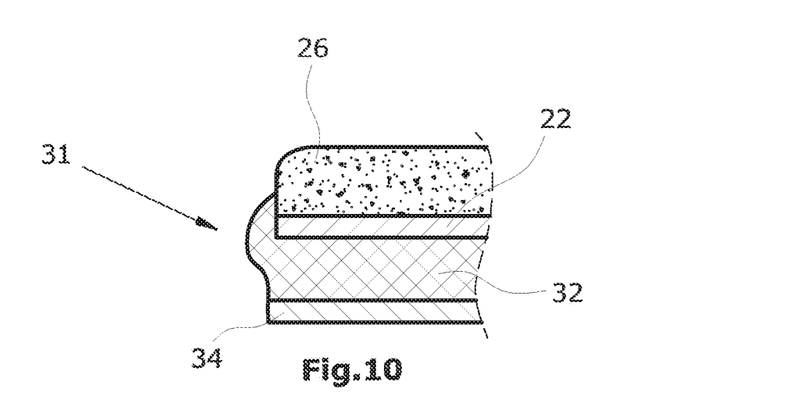
FIG. 10 is an enlarged sectional view of the bicycle saddle in a further preferred embodiment.

FIG. 10 shows a sectional view of an edge region of a bicycle saddle as it is illustrated in particular in FIGS. 1 to 7 and 9, wherein FIG. 10 illustrates a preferred embodiment. In this embodiment illustrated in FIG. 10, the elastomer body 32 is designed such that it has an additional protrusion 31. The protrusion 31 covers a lateral edge of the saddle shell 22 and extends upwards into the saddle cushion 26. Thereby, a lateral edge of the saddle cushion 26, which typically is a cut edge, is also covered. In a preferred embodiment the protrusion 31 is fully circumferential.

In the further invention of a bicycle saddle without saddle shell 22, illustrated in FIG. 8, it is possible as well to provide an elastomer body 32 having a protrusion 31. In this case, the same again protrudes into the region of an edge of the saddle cushion 26 which typically is a cut edge.

The invention claimed is:

1. A bicycle saddle comprising:
   a saddle shell;
   a saddle cushion connected to an upper side of the saddle shell;
   a support element connected to a saddle frame and a seat post; and
   an elastomer body arranged between the support element and the saddle shell,
   wherein a side surface of the elastomer body extends between and is at least partially exposed between the support element and the saddle shell,
   wherein the at least partially exposed portion of the side surface extends at least partially inward along an entire length of the bicycle saddle and is at least partly curved in shape,
   wherein in a midportion, a connecting line between an edge of the saddle shell and an edge of the support element has an angle of 0° to 30° with respect to a horizontal line, the connecting line extending perpendicular a longitudinal axis, extending in the longitudinal direction, of the bicycle saddle, and wherein the edge of the saddle shell contacts an edge of the elastomer body on opposing sides of the longitudinal axis, the contact between the edge of the saddle shell and the edge of the elastomer body extending along the entire length of the bicycle saddle.

2. The bicycle saddle of claim 1, wherein the side surface has a double curvature.

3. The bicycle saddle of claim 1, wherein the side surface has a first, concave curvature starting from the saddle shell.

4. The bicycle saddle of claim 1, wherein the side surface is curved in a S-shape, when seen in sectional view.

5. The bicycle saddle of claim 1, wherein, in top plan view, the support element is fully covered by the saddle shell.

6. The bicycle saddle of claim 1, wherein at the edge of the support element, the elastomer body is provided exclusively above the support element.

7. The bicycle saddle of claim 1, wherein, starting from the midportion, a connecting line between an edge of the saddle shell and an edge of the support element increases towards a rear of the saddle with respect to the horizontal line or a region of the seat region directed towards the midportion.

8. The bicycle saddle of claim 1, wherein, in a rear region of the saddle, a connecting line between an edge of the saddle shell and an edge of the support element has an angle of 30° to 90°, with respect to the horizontal line.

9. The bicycle saddle of claim 1, wherein the elastomer body comprises a material selected from the group consisting of TPU (thermoplastic polyurethane) and EVA (ethyl vinyl acetate).

10. The bicycle saddle of claim 1, wherein the support element is formed integrally.

11. The bicycle saddle of claim 1, wherein an outer contour of the elastomer body corresponds to an outer contour of the bicycle saddle.

12. The bicycle saddle of claim 1, wherein an outer contour of the saddle shell corresponds to an outer contour of the bicycle saddle.

13. The bicycle saddle of claim 1, wherein, when loaded, the saddle shell is pivotable relative to the support element about the longitudinal axis for an angle from 0° to 10°.

14. A bicycle saddle comprising:
a saddle shell;
a support element connected to a saddle frame and a seat post; and
an elastomer body arranged on an upper side of the support element and on a lower side of the saddle shell,
wherein a side surface of the elastomer body extends between and is at least partially exposed between the support element and the saddle shell,
wherein the at least partially exposed portion of the side surface extends at least partially inward along an entire length of the bicycle saddle and is at least partly curved in shape,
wherein, in a midportion, a connecting line between an edge of the elastomer body and an edge of the support element has an angle of 0° to 30° with respect to a horizontal line, the connecting line extending perpendicular a longitudinal axis, extending in the longitudinal direction, of the bicycle saddle, and
wherein an edge of the saddle shell contacts the edge of the elastomer body on opposing sides of the longitudinal axis, the contact between the edge of the saddle shell and the edge of the elastomer body extending along the entire length of the bicycle saddle.

15. The bicycle saddle of claim 14, wherein, starting from a midportion, a connecting line between an edge of the elastomer body and an edge of the support element increases towards a rear of the saddle with respect to a horizontal line or a region of the seat region directed towards the midportion.

16. The bicycle saddle of claim 14, wherein, in a rearward region or a rear region of the saddle, a connecting line between an edge of the elastomer body and an edge of the support element has an angle of 30° to 90°, with respect to the horizontal line.

17. The bicycle saddle of claim 14, wherein a saddle cushion is provided on an upper side of the elastomer body.

18. The bicycle saddle of claim 17, wherein a reinforcing element is provided between the elastomer body and the saddle cushion.

19. The bicycle saddle of claim 18, wherein the reinforcing element is provided in an edge region of the elastomer body and of the saddle cushion.

20. The bicycle saddle of claim 18, wherein the reinforcing element extends in a circumferential direction, has a width of less than 20 mm, and is of a frame-shaped design.

21. A bicycle saddle comprising:
a saddle shell;
a saddle cushion connected to an upper side of the saddle shell;
a support element connected to a saddle frame and a seat post; and
an elastomer body arranged between the support element and the saddle shell,
wherein a side surface of the elastomer body extends between and is at least partially exposed between the support element and the saddle shell,
wherein the at least partially exposed portion of the side surface extends at least partly inward along an entire length of the bicycle saddle and is at least partly curved in shape,
wherein in a midportion, a connecting line between an edge of the saddle shell and an edge of the support element has an angle of 0° to 30° with respect to a horizontal line, the connecting line extending perpendicular a longitudinal axis, extending in the longitudinal direction, of the bicycle saddle, and
wherein the edge of the saddle shell contacts an edge of the elastomer body on opposing sides of the longitudinal axis.

* * * * *